(12) United States Patent
Baret

(10) Patent No.: US 6,537,121 B1
(45) Date of Patent: Mar. 25, 2003

(54) PROCESS FOR THE MANUFACTURE OF COMPONENTS ON GLASS SUBSTRATES THAT HAVE TO BE SEALED, SUCH AS FLAT DISPLAY SCREENS OF THE PLASMA-PANEL TYPE

(75) Inventor: Guy Baret, Grenoble (FR)

(73) Assignee: Thomson Licensing S. A., Boulogne Cedex (FR)

( * ) Notice: Subject to any disclaimer, the term of this patent is extended or adjusted under 35 U.S.C. 154(b) by 0 days.

(21) Appl. No.: 09/573,648

(22) Filed: May 18, 2000

(30) Foreign Application Priority Data

May 21, 1999 (FR) .............................. 99 06457

(51) Int. Cl.[7] .............................. H01J 9/32; G09G 3/10
(52) U.S. Cl. ........................ 445/25; 445/24; 315/169.4; 427/386
(58) Field of Search ........................ 349/190; 428/436, 428/437, 413, 414, 415, 417; 445/24, 25

(56) References Cited

U.S. PATENT DOCUMENTS

| | | | |
|---|---|---|---|
| 3,904,460 A | * 9/1975 | Comperatore | ............... 156/102 |
| 5,198,723 A | * 3/1993 | Parker | ........................ 313/493 |
| 5,911,613 A | * 6/1999 | Byrum et al. | ................. 445/26 |
| 6,118,215 A | * 9/2000 | Byrum et al. | ............... 313/634 |
| 6,144,435 A | * 11/2000 | Yokoyama et al. | ......... 349/133 |
| 6,236,445 B1 | * 5/2001 | Foschaar et al. | ............ 349/156 |
| 6,242,859 B1 | * 6/2001 | Betsui et al. | ................ 313/584 |

FOREIGN PATENT DOCUMENTS

| | | | |
|---|---|---|---|
| EP | 0529392 A1 | 3/1993 | ............. H01J/9/26 |
| FR | 2727568 | 5/1996 | ............. H01J/31/12 |
| GB | 1348204 | 3/1974 | ............. G09F/9/32 |
| JP | 04 215230 | 6/1992 | ............. H01J/17/18 |

OTHER PUBLICATIONS

French Search Report dated: Feb. 4, 2000.
Patent Abstracts of Japan, vol. 016, No. 558 (E–1294), Nov. 27, 1992.

* cited by examiner

Primary Examiner—Robert Dawson
Assistant Examiner—Michael J Feely
(74) Attorney, Agent, or Firm—Joseph S. Tripoli; Joseph J. Laks; Carlos M. Herrera

(57) ABSTRACT

The process for manufacturing a plasma display panel, wherein two glass substrates are sealed together using a sealing material of epoxy or polyvinyl butyrate. The sealed structure provides a space between the substrates to contain a discharge gas. The choice of an epoxy or polyvinyl butyrate sealing material allows for relatively low processing temperatures in order to cure the sealing material. This relatively low processing temperature, of between 200° C. and 300° C., lowers the risk of cracking or microcracking of intermediate layers, which are formed on the surfaces of the substrates.

19 Claims, 2 Drawing Sheets

PROCESS FOR THE MANUFACTURE OF COMPONENTS ON GLASS SUBSTRATES THAT HAVE TO BE SEALED, SUCH AS FLAT DISPLAY SCREENS OF THE PLASMA-PANEL TYPE

FIELD OF THE INVENTION

The present invention relates to the production of components on glass substrates that have to be sealed, such as flat display screens of the plasma-panel type or field-emission display (also known by the name FED) devices.

BACKGROUND OF THE INVENTION

In such uses, a component is produced by an assembly of two glass substrates which have to be sealed one against the other. The substrates, whose size is at least equal to the working area of the display screen, may amount to more than 100 cm in diagonal. They constitute fundamental elements for the component. Glass is chosen as the substrate material for several reasons.

Firstly, when a substrate forms the visible part of a display screen it is imperative for the latter to have suitable optical and mechanical properties.

Secondly, the various steps which are involved in the manufacture of a component of the aforementioned type expose the substrate to high temperatures, of the order of 600° C. in the case of some of them. It is therefore necessary to ensure that the material of the substrate can, on the one hand, withstand these temperatures and, on the other hand, meet its precise original dimensions after the manufacturing steps.

At the present time, only mineral glass is capable of meeting these prerogatives in an inexpensive manner.

Moreover, the production of the aforementioned components on a glass substrate involves the deposition of successive superposed layers in order to form structural elements or to create laminated layers. It may especially be necessary to superpose two or more layers of different materials. In this case, the various superposed materials often do not have the same thermal expansion coefficients. It follows that superposed layers are subjected to high mechanical stresses when they are exposed to high temperatures. These stresses, which act in shear at the interface between two layers, may generate, in the layers, cracks or microcracks which are liable to reduce the performance or the lifetime of the component.

In order to allow these stresses that a substrate is subjected to during the manufacture of a component to be better understood, we will consider, with reference to FIGS. 1 to 5, the example of a colour plasma panel (PP) produced from two glass substrates.

The PP illustrated is of the AC type with a matrix structure. Its operation is thus based on the light discharge between two facing dielectric layers, each covered with a layer of magnesia (magnesium oxide) MgO, the said layers covering an array of electrodes on a respective glass substrate. Such a panel is described in particular in the Applicant's French Application No. 97/07181.

As shown in FIG. 1, each of the substrates is in the form of a glass tile 2, 3 having an area which corresponds to the display aspect ratio of the screen, plus a peripheral portion comprising the connection elements and the means for sealing the substrates (FIGS. 2 to 5). These substrates 2, 3 are placed opposite each other with a small separation between the facing faces (the internal faces) making it possible, when they are joined together, for a discharge gas to be contained.

The first substrate 2, intended to form the front face of the PP (with respect to the observer), carries a first array of parallel electrodes Y1–Y3 which constitutes the row electrodes. These electrodes are embedded in a thick layer 5 of dielectric material. This layer is itself covered with a thin dielectric layer 51, for example of magnesia (MgO), which is intended to be exposed to the discharge gas.

The second substrate 3 carries a second array of parallel electrodes X1–X5, also embedded in a thick layer 6 of dielectric material which is itself covered with a thin dielectric layer 61 intended to be exposed to the discharge gas. These electrodes are placed so as to be perpendicular to the electrodes Y1–Y3 of the first array and constitute the column electrodes.

The second substrate 3 furthermore includes a set of straight barriers 7 on the thin layer, one barrier being placed along each mid-axis between two adjacent column electrodes X1–X5.

The surface of the second substrate 3 between the barriers 7 is covered with phosphor stripes 8, 9, 10 deposited directly on the thin layer. Each phosphor stripe is contained between two adjacent barriers 7. Together, the stripes form a repetitive pattern of three successive adjacent stripes 8, 9, 10 of different emission colours, for example red, green and blue.

The phosphor stripes 8, 9, 10 include areas $Ep_1$–$Ep_n$ recessed in the phosphor material, vertically in line with each electrode Y1–Y3 of the first array of electrodes of the opposed substrate 2. These areas, called "apertures", thus directly expose the thin dielectric layer to the discharge gas at the points of intersection between the first and second electrode arrays. They make it possible to produce discharge cells that correspond with these points.

Thus, in the example illustrated, the intersections made by the first row electrode Y1 with the column electrodes X1–X5 define a row of cells, each cell being physically formed by an aperture: the first cell C1 is located at the first aperture $Ep_1$, the second cell C2 is located at the second aperture $Ep_2$ and so on, until the fifth aperture $Ep_5$ illustrated, which physically forms a fifth cell C5. The first, second and third apertures $Ep_1$, $Ep_2$, and $Ep_3$ are located in a green phosphor stripe 8, a red phosphor stripe 9 and a blue phosphor stripe 10 respectively. They thus correspond to monochromatic cells of three different colours which, among the three, may form a trichromatic cell.

The barriers 7 have two functions. On the one hand, they serve to confine the light discharges to the cell which generates them, especially by preventing the propagation of the discharges towards the row electrodes Y1–Y3 by ionization effect. They thus prevent the phenomenon of crosstalk between the cells. On the other hand, the barriers 7 constitute screens for the light radiation from one cell with respect to the neighbouring cells towards the row electrodes Y1–Y3, avoiding a crosstalk effect with is manifested by a lack of colour saturation.

The barriers 7 may also have a function of spacing the substrates 2, 3, as in the example illustrated. In this case, the height H1 of the barriers fixes the separation between the tiles, the tile 2 carrying the row electrodes Y1–Y3 bearing on the top of the barriers.

According to other designs, the space in between the substrates 2, 3 is fixed not by means of barriers but by spacer elements distributed over the surface of at least one of the substrates. These spacer elements, also known as spacers, make it possible in particular to clear a space above the barriers for better distribution of the ionization around the cells.

The geometry and the sealing of the two substrates will now be described with reference to FIGS. 2 to 5.

FIG. 2 is a simplified plan view showing the first substrate 2 superposed on the second substrate 3 when the PP is in the assembly phase.

The column electrodes X1, X2, X3, etc. and the row electrodes Y1, Y2, Y3, etc. of the respective substrates 3 and 2 extend slightly beyond the edges of the latter so as to form connection regions Xa1, Xa2 and Ya1, Ya2 with outputs of an electronic drive circuit (not illustrated). The electronic drive circuit delivers to the electrodes the various voltages (of the order of 100 to 150 volts) necessary for selectively igniting, maintaining or extinguishing a light discharge at the points of intersection between the row and column electrodes.

The first substrate 2 comprises two regions Ya1, Ya2 for connecting the electrodes Y1, Y2, Y3, etc. to opposed respective edges perpendicular to the direction of these electrodes. Each connection region Ya1 or Ya2 includes the extensions of one column electrode in two, alternating with those that the other connection region Ya2 or Ya1 includes.

Likewise, the second substrate 3 comprises two regions Xa1, Xa2 for connecting the electrodes x1, x2, x3, etc. to opposed respective edges, perpendicular to the direction of these electrodes. Each connection region Xa1 or Xa2 of this substrate includes the extensions of one row electrode in two, alternating with those that the other connection region Xa2 or Xa1 includes.

In order to facilitate the connections, the respective aspect ratios of the first and second substrates 2, 3 are slightly different so that, for each of the latter, there is a margin (respectively 2a and 3a) not covered by the other substrate. For a given substrate, these margins 2a, 3a lie at the two opposed edges from which the electrodes of this substrate extend.

The first and second substrates 2, 3 are sealed by a glass fillet 14 around the perimeter of the overlap region of the substrates (FIG. 3). In the example, the glass fillet 14 is deposited on the first substrate 2. The perimeter of the seal with respect to this substrate lies along the two edges parallel to the row electrodes Y1, Y2, Y3 of this substrate 2 and inside the margin 2a located along the other two opposed edges.

It will be noted that for the sake of clarity the width of the margins 2a and 3a is illustrated in a highly exaggerated manner; in reality, the margins have a width of only a few millimeters while one side of a substrate may measure several tens of centimeters.

FIG. 4 is an end view which shows the insertion of the seal 14 with respect to the two substrates 2, 3. The thickness of the seal corresponds to the spacing between the two substrates, which is determined by the height of the barriers. In this figure, the spacing between the two substrates is highly exaggerated for the sake of clarity, the seal having a typical thickness of about a hundred microns for a width of a few millimeters.

In order to allow vacuum pumping of the discharge space contained between the two substrates within the perimeter of the seal 14, one of the substrates (that 3 intended to form the rear face of the PP) includes a pip 16. The pip 16 forms a means of access to the discharge space. It is therefore located at a point on the substrate inside the perimeter of the seal 14 but outside the electrode array. The pip is formed by a hole passing through into the substrate, the external opening of which is extended by a section of glass tube forming a teat. After vacuum pumping and filling with low-pressure discharge gas, the teat is sealed off by melting its opening.

FIG. 5 illustrates, on a more precise scale, the profile of the seal 14 in contact with the second substrate 3.

It will be understood from the foregoing that the correct operation of the PP requires a very high degree of alignment precision, at the end of production and of assembly, on the one hand between the superposed elements on the substrates (electrodes, barriers, apertures, phosphors) and on the other hand between the first and second substrates sealed together.

This requisite alignment precision is greater the more complex the structure of the display device and the higher its definition. By way of example, a PP of the type described, having a screen with a television aspect ratio corresponding to a 107 cm diagonal and a horizontal definition of 560 lines requires a relative alignment precision of the aforementioned elements of the order of 30 ppm (parts per million) i.e. 0.003%.

The production of the various superposed elements on the glass substrates and the sealing of the latter involve firing steps which must conventionally be carried out at high temperatures. However, at such temperatures the glass substrates may undergo deformations deleterious to this precision.

In general, the substrates 2, 3 are subjected to a first firing operation during the deposition of the thick dielectric layers 5, 6. These thick layers 5, 6 embed the electrodes X1–X5 or Y1–Y3 which have been deposited beforehand on the respective substrates by metallization steps. Typically, the dielectric material serving for these layers is a mineral such as a lead borosilicate. During deposition on the substrate, it is in the form of a glass frit in suspension in a binder in order to allow liquid-phase deposition. This deposition is carried out according to various techniques, such as screen printing, spin-on deposition or spin casting, etc.

Once this layer has been deposited, the substrates 2, 3 are subjected to a firing step intended to burn off the binder and melt the glass frit. The firing temperature must therefore be at least equal to the melting point of the dielectric, which in the case of a lead borosilicate dielectric is 580° C.

At least one of the substrates undergoes a second firing step in order to stabilize the barriers 11 and, as the case may be, the specific spacers.

The barriers are typically formed on the thin dielectric layer by successive liquid-phase depositions of a precursor. This precursor includes a photosensitive resin and an inorganic filler such as a mineral glass, this filler forming the material of the barriers. Normally, this material needs to be highly sintered, at a temperature in the region of 500° C. The layer may be deposited by various techniques, such as spraying, vaporization or spin-on deposition.

The barrier pattern is formed by photolithographic techniques applied successively to each cumulative layer of precursor until the required barrier height is obtained.

Once these operations have been carried out, the successive layers are fired at a temperature of the order of 480° C. to 550° C. The purpose of this firing step is to eliminate all traces of the photosensitive binder and to melt the sintered particles which form the barrier.

The substrate 3 bearing the barriers undergoes a third firing after the phosphor stripes have been deposited between the barriers. Each of the three emission colours is obtained by a specific phosphor, which is deposited independently of the others in the form of a layer. The stripe pattern for each phosphor layer is produced by photolithograpic techniques. The purpose of the firing is to burn off the photosensitive binder and to stabilize the phosphor layers. It is typically carried out at a temperature of between 400° C. and 510° C.

A fourth firing step to which the two substrates 2, 3 are subjected takes place during the sealing of the gas discharge space between these substrates.

In the prior art, the sealing is achieved by means of a fillet of glass paste deposited around the perimeter of at least one of the substrates 3, as described above with reference to FIGS. 3 to 5. Conventionally, a lead borosilicate glass is used for this paste. The glass may be in a vitrifiable or devitrifiable form depending on the technique used. The glass paste is generally deposited by means of a syringe. When the two substrates have been joined together, the assembly is subjected to a firing step for the purpose of curing the glass paste so as to fix the substrates in their definitive configuration.

The firing for this sealing step takes place at the melting point of the sealing glass, which lies between 420° C. and 450° C.

Once the substrates 2, 3 have been sealed, an operation of vacuum pumping through the pip 16 is carried out in order to remove the air confined in the discharge space. Next, a low-pressure (500 to 800 mbar) gas mixture is introduced into this space, making it possible to obtain the plasma discharge conditions. The pip 16 is then sealed by closing off its glass teat by melting.

To summarize, in most of the current processes for manufacturing plasma panels the following firing steps are found:

1. Firing of the dielectric layers, at temperatures close to 580° C.;
2. Firing of the barriers (optionally with spacers) at temperatures ranging from 480° C. to 550° C.;
3. Firing of the phosphors, at temperatures ranging from 400° C. to 510° C.; and
4. Firing of the glass paste fillet for sealing the PP, at temperatures close to 450° C.

Each high-temperature firing causes the substrates to deform, so that the losses in precision are cumulative during all the manufacturing steps. Thus, it would be advantageous to be able to reduce the firing temperature albeit for only one of the steps.

The glass substrates conventionally used are all made of soda-lime glass, with a glass transition temperature $T_g$ of approximately 520° C. This type of glass densifies greatly, by an amount of 400 to 600 ppm, during the firing operations at temperatures around 600° C. if it has not been prestabilized.

The glass may be stabilized at a certain point by an initial firing at approximately 580° C. before it is used as a substrate. However, despite this initial stabilization, the glass tends to deform during the firing steps at temperatures of 480° C. and higher.

Recently, glasses having a composition different from that of soda-line glass have become available which allow the initial tolerances to be better maintained after the firing steps. These glasses have higher glass transition temperatures $T_g$, ranging from approximately 580° C. to 620° C. They also need to be prefired in order to stabilize them, but they then meet the dimensional stability tolerances much better. Their dimensions therefore remain more or less constant, the deviations remaining less than 10 to 30 ppm. However, these glasses are not generally adopted for components such as flat screens because their cost is still too high.

SUMMARY OF THE INVENTION

Given these problems, one object of the present invention is to prevent the risk of forming cracks or microcracks in the structural elements or the layers of the component formed on glass substrates, especially in the thin dielectric layer of magnesia formed on the thick dielectric layer in the case of an AC plasma panel for example.

For this purpose, the invention provides a process for manufacturing components, such as flat screens, of the type comprising first and second substrates which are sealed one with respect to the other by a seal, the said process making it possible to seal the substrates at a temperature substantially below that used in the prior art.

According to the invention, this reduction in sealing temperature is obtained by using for the seal a material of the epoxy type or polyvinyl butyrate (PVB) type and by subjecting the seal to a treatment temperature of between 200° C. and 300° C. after the first and second substrates have been positioned.

In other words, the invention makes it possible to reduce the temperature by 150 to 200° C. with respect to the conventional sealing techniques carried out with a seal made of glass, therefore requiring to be melted at a temperature of the order of 450° C.

In turns out that such a temperature reduction has a major influence on the effects of cracks or microcracks in the layer-deposited elements, especially with regard to the thin layer of inorganic dielectric material (for example MgO) forming the discharge surface in the case of a plasma panel.

This is because, due to the different thermal expansion coefficients between the glass, the thick dielectric and the MgO, cracking may occur in the thin MgO layer when a temperature of approximately 400° C. is reached. Thus, by virtue of the invention, the low-temperature sealing makes it possible to be far from this limit.

Moreover, a conventional soda-lime glass remains more or less stable at the curing temperature for the sealing step according to the invention. This curing is also one of the most critical steps since it is liable to affect the relative position of the first and second substrates.

Thus, the process according to the invention plays a part in improving the geometrical precision of the component without having to correspondingly abandon the use of soda-lime glass as the material for the substrates.

Preferably, a material of the polyvinyl butyrate (PVB) type is used since this material outgasses little at the above treatment temperatures.

The invention is all the more surprising as the use of an epoxy or of PVB for the seal would seem in a first analysis to be proscribed since these materials are generally presented as being permeable to water vapour. Now, the diffusion of water vapour through the seal would consequently contaminate the sealed space, for example the space containing the discharge gas in the case of a plasma panel, and therefore degrade the operation of the component.

However, the Applicant has unexpectantly discovered that this intrinsic permeability of the material does not result in a loss of quality in the sealing of the glass substrate.

Advantageously, the seal is very thin relative to its width, this width being defined as the separation between the internal and external edges of the latter. With this configuration, the ratio of the exposed section of the seal to the distance from one edge of the seal to the other is small, this being conducive to impermeability. This ratio may be of the order of 1:n, where n is 20 or more, preferably greater than 30, or even greater than 40.

Preferably, pressure is applied to the seal during the sealing step. This pressure may be equal to or greater than 1 kg/cm$^2$, or even greater than 2 kg/cm$^2$.

When the manufacture of the component requires the space between the first and second substrates to be pumped via a means of access to this space, such as a pip provided on one of the substrates, this means may also be sealed by means of an organic material based on an epoxy or on a polyvinyl butyrate.

It should be noted that the use of a seal made of an organic material according to the invention also makes it possible to use organic materials to form structural layers or elements of the component. It follows that these structural layers or elements may be produced by techniques requiring only heat treatments at relatively low temperatures, like the step of curing the seal.

It is therefore possible to interpose at least one layer of organic material between the seal and at least one of the substrates. The seal can therefore rest, directly or indirectly, against at least one layer of organic material, for example the dielectric layer which covers the substrate of a plasma panel.

In addition, according to advantageous modes of implementing the invention, when at least one of the substrates requires a layer of dielectric to be deposited the latter is produced by a step of depositing, as a thin layer, an organic material requiring a stabilization temperature below a deformation temperature of the substrate.

Among the dielectric materials meeting this requirement, mention may be made of polyphenylquinoxalines (PPQ) or polyimides (PI). These materials stabilize at temperatures between 300° C. and 400° C. over a period of 20 to 60 minutes. Consequently, the substrate does not undergo appreciable degradation in its original dimensions during this step of stabilizing the dielectric layer. These layers of dielectric material may be deposited in the form of layers ranging from 3 to 20 microns, and preferably from 5 to 15 microns in thickness.

The dielectric layer thus obtained has a transparent natural appearance. It is possible to add colorants to the dielectric materials depending on the application. By way of example, it is possible to obtain a dielectric layer (or several dielectric layers) which are white in appearance, making it possible in particular to increase the luminous efficiency in the case of a plasma panel. This white appearance may be obtained by the addition of titanium oxide to the dielectric material.

Moreover, it is possible to add a filler comprising glass microspheres to the aforementioned dielectric material in order to retain the transparency of the layer(s) of dielectric. This situation may be useful especially in the case of an operation of exposing the photosensitive material.

Advantageously, a thin surface layer of a dielectric material, such as magnesium oxide (MgO) is deposited on this dielectric layer using a cold technique such as spraying or gun deposition.

When the manufacture of the component also includes the production of raised features or elements carried by at least one of the substrates, such as barriers in the case of a plasma panel, a preferred mode of implementing the invention involves producing these elements in a technology that does not require firing above 400° C.

For this purpose, organic materials, such as polyimides, may be used for these elements. Such materials may be photosensitive.

These organic compounds may be filled with at least one mineral additive in order to modify the colour and/or the creep strength thereof. The increase in strength thus obtained may be advantageous when these elements are subjected to high stresses, as in the case of the barriers of a PP which are subjected to high pressures during pumping.

As in the case of the dielectric layer, a filler comprising glass microspheres may be added to the constituent material of the raised elements in order to retain good transparency of the layer during the operation of exposing the photosensitive material.

The invention also relates to a display device, for example a plasma panel or a field-emission display device, comprising first and second substrates which are sealed one with respect to the other by a seal, characterized in that the seal is made of a material of the epoxy or polyvinyl butyrate type.

BRIEF DESCRIPTION OF THE DRAWINGS

Further advantages and characteristics of the invention will become more clearly apparent on reading the embodiments which follow, these being given purely by way of non-limiting example, with reference to the appended drawings in which.

DESCRIPTION OF PREFERRED EMBODIMENTS

Figure 1:
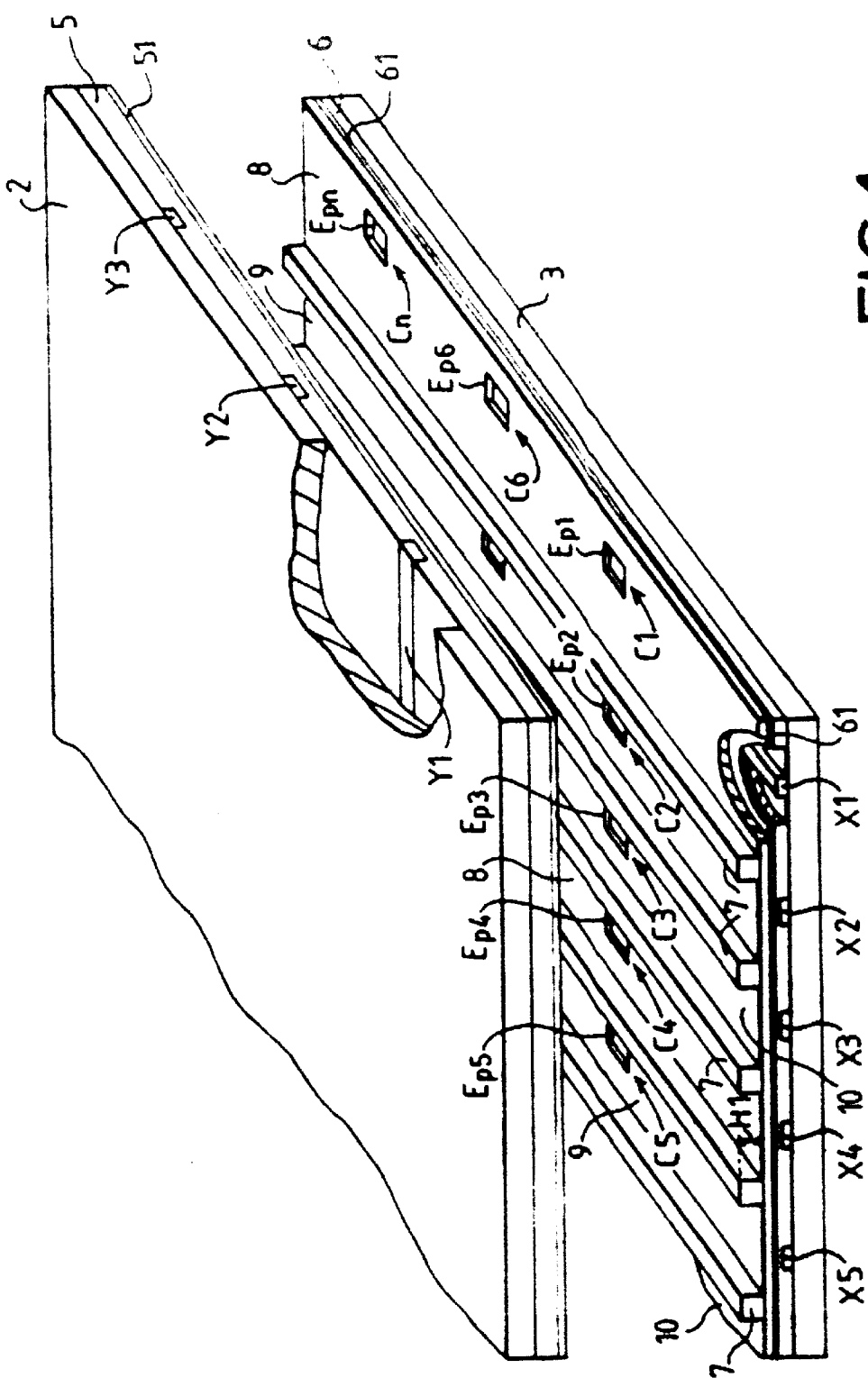
FIG. 1, already described, is a general view of a known colour plasma panel, of the AC type with a matrix structure.
Figure 2:
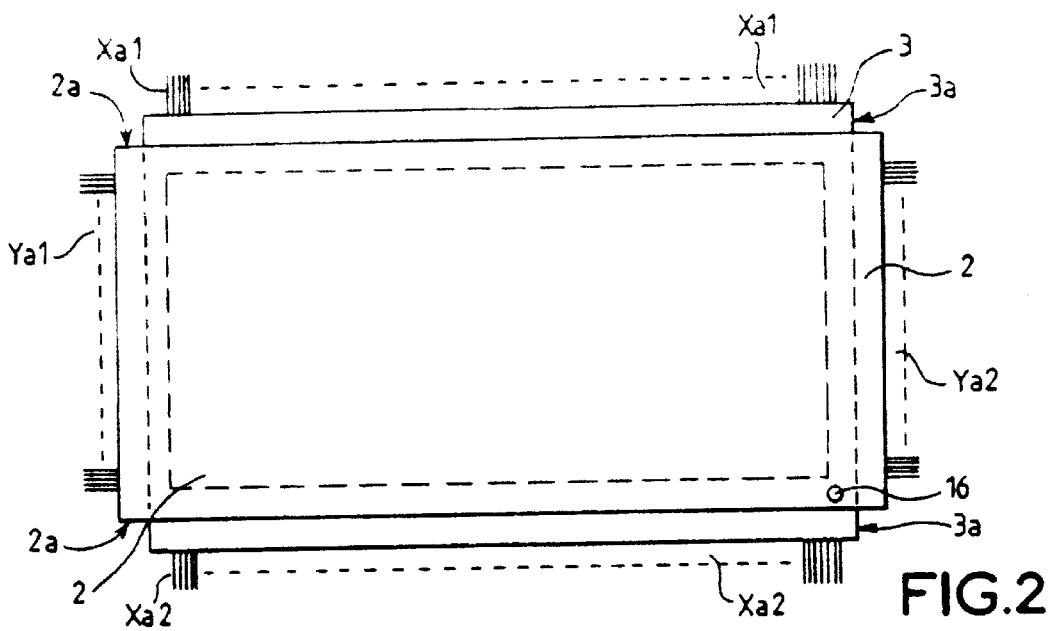
FIG. 2 is a simplified plan view showing the relative positions of the two substrates of the plasma panel of FIG. 1.

The example that will be given of a process of the present invention falls within the context of an AC-type colour plasma panel (PP), as described with reference to FIGS. 1 to 5. This description will therefore be regarded as incorporating the examples which follow and will not be repeated, for the sake of brevity; only the differences specific to the various aspects of the invention will be explained.

The process begins with the steps of preparing the substrates 2, 3. These substrates are in the form of tiles of soda-lime glass of optical quality, or of quality close to this level of quality. In the case of the production of a PP to the television aspect ratio with a 104 cm diagonal, the thickness of the tiles is of the order of 3 mm.

In the example in question, not one of the set of operations for manufacturing the PP requires a firing step at temperatures above 400° C.–440° C. Consequently, the glass substrates 2, 3 are not subjected to stresses liable to cause significant deformation away from their original dimensions. In addition, the substrates in this example are not subjected to an initial heat treatment aimed at stabilizing them, although such a treatment can, nevertheless, be envisaged while remaining within the scope of the invention.

The arrays of electrodes X1, X2, X3 etc. and Y1, Y2, Y3, etc. are firstly deposited on one of the surfaces of the respective substrates 3 and 2. The protruding ends of the electrodes, allowing connection to the output of an electronic drive circuit (cf. FIGS. 2 and 3), are also produced during this operation.

The process for depositing these electrodes is conventional. For example, it is possible to use photolithographic deposition. The electrodes have a laminate structure comprising two different metals, for example a chromium-copper-chromium sequence. Each layer of the sequence is separately deposited cold. However, it may be envisaged to produce the electrodes by depositing a single layer of aluminium or of silver followed, as the case may be, by a firing step.

After the metallization layers have been deposited, the substrates are subjected to a firing aimed at stabilizing the electrodes on the surface of the glass. This firing step is normally carried out at relatively low temperatures and does not impair the initial geometrical precision of the substrates.

Next, the step of depositing the layers of dielectric 5, 6 on the respective substrates 2, 3 is carried out. These layers cover the entire working surface of the substrates and embed the electrode arrays.

In order to stabilize these layers by a curing step at relatively low temperature, they are produced from an organic material deposited as a thin layer. The thickness of the layer depends, inter alia, on the relative dielectric constant $\epsilon_r$. The thickness will normally range from 2 to 20 microns and, in most cases, be between 5 and 12 microns for a relative dielectric constant $\epsilon_r$ of between 2 and 4.

This material may be of the family of polyphenylquinoxaline (PPQ) or of polyimides (PI). However, it is conceivable for this purpose to use any organic material able to be deposited as a thin layer.

In the example, the layer of organic material is a polyimide which has the following characteristics:

transparency to visible light, a thickness of between 5 and 12 microns, given the fact that the relative dielectric constant $\epsilon_r$ is between 2 and 4, a voltage strength greater than 400 V for a layer thickness of 5 microns, and compatibility with the expansion coefficient of the glass of the substrate.

The organic material is deposited in liquid phase using known techniques: screen printing, dip coating or roller coating. The liquid phase includes the filler of organic material in a suitable solvent. It may furthermore include a photosensitive agent in order to allow a treatment by photogravure.

The thin layer thus obtained is firstly dried at a temperature of the order of 100° C., for example by means of a hot-air knife.

Next, the layer is cured on the substrate during a stabilization step which takes place at a temperature of between 300° C. and 400° C. The duration of this stabilization step is approximately 20 to 60 minutes.

Depending on the requirements, it is possible to give the dielectric layer a dark or white, or even coloured, appearance by the addition of a colorant to the precursor organic material. Thus, the addition of titanium oxide to the organic material makes it possible to obtain a white dielectric layer useful for increasing the luminous efficiency of the PP.

In the example, in the case of each of the two substrates 2, 3, a thin surface layer 51 and 61 of magnesium oxide (MgO) is deposited on the respective dielectric layers 5 and 6 (FIG. 1). These surface layers 51 and 61 are deposited to a thickness of the order of 0.5 $\mu$m by a cold technique, such as spraying or gun deposition. The magnesium oxide has a chemical stability and a secondary emission coefficient which are suitable for the role of an interface with the discharge gas and are well able to withstand the arc spots during the plasma discharges.

Once the layers of dielectric material have been deposited, the barriers 7 are then produced. In the example in question, these barriers are only present on the second substrate 3.

The barriers are produced by photogravure on layers of photosensitive organic precursor material. Such a material may be a polyimide.

In the example, the liquid phase for the layer is prepared from a solvent laden with a polyimide. This liquid phase is sufficiently photosensitive to allow the use of photogravure techniques, either because of the inherent properties of the polyimide and/or of the solvent, or by the addition of a photosensitizer. Polyimide-based photosensitive organic compounds capable of fulfilling this function are commercially available.

If necessary, the organic material may be filled with a mineral additive in order to modify either its colour or its creep strength during the phase of vacuum pumping the panel (during which the pressure may reach approximately $10_6$ pascals, i.e. 10 kg/cm$^2$). It is also possible to add a filler comprising glass microspheres in order to retain good transparency of the layer during the operation of exposing the photosensitive material.

The aforementioned liquid phase is deposited on the dielectric 7 of the second substrate 3 so as to form a layer having a thickness of the order of 20 microns. This layer may be produced using the same deposition techniques as for the dielectric layer: deposition by screen printing, dip coating, etc.

This organic layer is then dried using an air knife at a temperature of approximately 100° C.

Next, a photolithographic mask is laid on the organic layer, this mask having a pattern of elongate apertures corresponding to the pattern of barriers to be printed. Those parts of the layer which are revealed by the mask are exposed to ultraviolet radiation so as to make them resistant to the development. The layer is then developed using water to which a carbonate has been added, then the surface is dried using an air knife.

A relief pattern, which is the image of the barriers, is then obtained with a height corresponding to the thickness of the layer of organic material, i.e. approximately 20 microns.

In order to achieve the required height for the barriers, that is to say of the order of 100 microns, all the aforementioned steps, from depositing the layer of organic material in liquid phase as far as development after exposure, are reiterated as many times as necessary, each iteration increasing the height or thickness of a layer.

Depending on the number of iterations, the vertical position of the screen-printing mask, or the depth of the latter, is modified in order to take into account the growth in the existing deposited layers on the tile.

After the photolithography cycles, the barrier structure thus obtained is cured in a curing step at a low temperature relative to the deformation temperature of the substrate. Typically, this curing is carried out at a temperature of 300° C. to 400° C. for a period of approximately 20 to 60 minutes.

Should the organic material lend itself thereto, it is also possible to envisage stabilizing the barrier structure using a photon treatment, for example by exposing it to ultraviolet light. This treatment may either replace the aforementioned curing or complement the latter.

Once the barriers have been produced, the phosphor layers are then deposited by photolithography. In the PP illustrated in FIG. 1, these layers form stripes, each occupying the area between two adjacent barriers 7. The successive stripes form a repeat pattern of groups of three adjacent stripes, each of the latter having respectively an emission colour in the green, the red and the blue.

The phosphor corresponding to one of the emission colours (for example the green) is prepared in the form of a liquid comprising a photosensitive resin and fine particles of a phosphor material in suspension.

This liquid is dispersed in the form of a layer over the entire internal surface of the substrate 3 using the same techniques as those for depositing the barriers 7.

After the layer has dried, a photolithographic mask is laid on the internal face of the substrate 3, the mask exposing only every third surface stripe between the barriers 7 starting from a reference point, the other two stripes and the tops of the barriers being masked. The mask also conceals, in the exposed stripes, the surface portions which correspond to the apertures $Ep_1$–$Ep_2$ in the phosphor. The exposed surfaces are photosensitized by applying ultraviolet radiation through the mask.

The layer is developed so as to remove all the unexposed parts, thus leaving on the dielectric phosphor stripes 9 of the same emission colour at every third location between two adjacent barriers.

These operations are repeated for the other two phosphor layers. Each new layer is deposited in liquid phase over the entire surface of the substrate 3, including on the previously deposited phosphor stripes. For the photosensitization step, the same mask is used but by placing it so as to be offset by one stripe width with respect to the previous use, so as to form the pattern of successive stripes of different colours.

After the steps of depositing the three phosphors, they are fired at a temperature of between 380° C. and 440° C. Preferably, a temperature not exceeding 420° C. is used.

Next, the steps of assembling and of sealing the first and second substrates 2 and 3 are carried out.

The process starts by preparing the seal 14. According to the present invention, this seal is made of a material of the epoxy or polyvinyl butyrate type, which allows treatment at a relatively low temperature of between 200° C. and 300° C. This type of material is commercially available, being especially used as interlayer for the laminated glass panes of motor-vehicle windows.

The shape and position of the seal 14 are substantially as those described above with reference to FIGS. 3 to 5. In particular, the thickness of the seal 14, fixed by the height of the barriers when the latter also function as spacers, is of the order of 100 microns. The width of the seal 14 (the distance between the inner edge 14a and outer edge 14b, in FIG. 5) is of the order of a few millimeters, for example 5 mm in the specific case. It should therefore be noted that the width of the seal here is approximately 50 times greater than its thickness.

The seal 14 may be deposited on one of the substrates (or optionally on both substrates) using various techniques.

Figure 3:
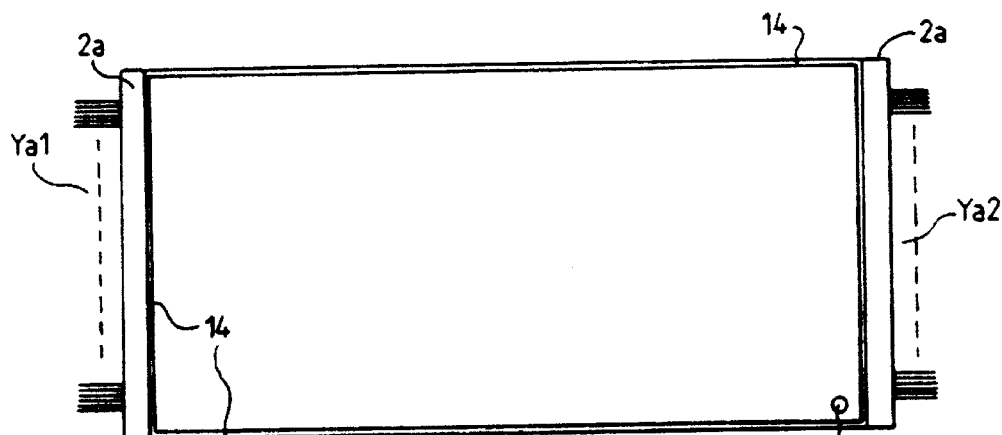
FIG. 3 is a simplified plan view of one of the substrates illustrated in FIG. 2, showing the position of a seal.

It is possible to prepare the seal 14 in the form of a flexible film of epoxy or of PVB cut to the shape of the seal, that is to say in the form of a frame defining the perimeter of the gas space to be sealed (FIG. 3). In this case, the film is deposited, either hot or cold, on one of the substrates, directly on the dielectric surface 5 or 6. The thickness of the film may be slightly greater than the separation required for the two substrates, because of the possible compression of the film due to the pressure exerted by the substrates.

Figure 4:
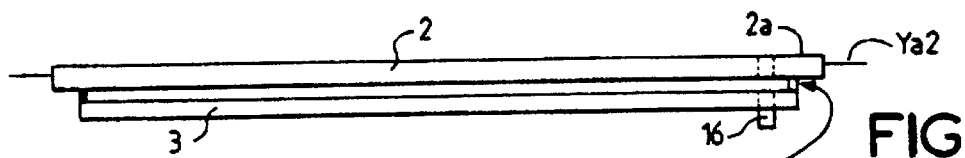
FIG. 4 is an end view of the two substrates illustrated in FIG. 2.
Figure 5:
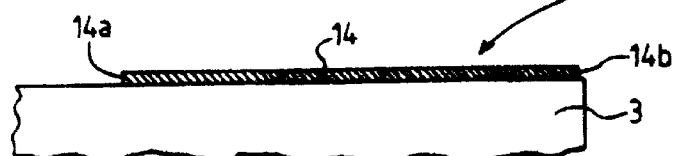
FIG. 5 is an enlarged view of part of FIG. 4 around the seal.

It is also conceivable to prepare the material of the seal (epoxy or PVB) in the form of a paste, allowing it to be deposited using a syringe (or using a similar technique) directly on one of the substrates (or on both). A layer of the seal material may thus be formed by a relative displacement between the substrate receiving the layer and a head for applying this layer, for example by means of a robot arm. The relative displacement may then be programmed to follow the perimeter of the substrate (FIGS. 3 to 5).

In this case, it is also possible to deposit the seal material with an extra thickness, the layer automatically being compressed by the pressure so as to assume the correct height.

Next, the two substrates 2, 3, with the seal 14 interposed between them, are superposed. The assembly is then subjected to a treatment at a temperature of between 200° C. and 300° C. for the purpose of setting the material of the seal and of fastening the latter to the contact surfaces of the substrates. The duration of this treatment is about 30 to 60 minutes. A pressure of about 2 to 4 kg/cm$^2$ is applied to the seal during this operation.

The process continues with the vacuum pumping of the space contained between the two substrates, on the inside of the seal 14.

The pumping is carried out via the pip 16 (FIGS. 3 to 5) at a temperature of between 180° C. and 250° C. The duration of this operation is a few hours using various means to accelerate the pumping, such as getters.

It has been found that the material used for the seal, whether it be an epoxy or a PVB, satisfactorily withstands this pumping operation at temperature.

After the vacuum pumping and the filling of the space with a discharge gas, the pip 16 is sealed. The sealing of the pip 16 may be carried out by closing off the latter by depositing the material used for the seal, namely some epoxy or polyvinyl butyrate (PVB). In this case, the material may be injected into the pip 16 so as to form a plug in the tube forming the teat. The pip-sealing material may be stabilized by a local heat treatment at a temperature of 200° C. to 300° C., for example using a hot-air jet.

In the example given, it may be pointed out that, for carrying out the various steps of the process (deposition of the thick dielectric, the barriers, the phosphors and the seal), materials are used that require stabilization temperatures which may remain below 400–440° C. Now, for temperatures below 440° C., soda-lime glass does not change in dimensions over periods of a few hours. Soda-lime glass, even unstabilized, is then completely compatible with a process for manufacturing AC-type colour plasma panels, or other components requiring similar tolerances.

The present invention is in no way limited to the example given, both as regards the type of component in question and the choice of the materials and processes used for the various manufacturing steps. It will be noted, inter alia, that the techniques described relating to the deposition of the dielectric layer on the substrate or to the production of the barriers may be replaced with conventionally used techniques, while remaining within the scope of the invention, even if they require temperatures above those indicated. This is because, as explained in the introduction, the aim of the invention is firstly to help to reduce the effects of the deformation of the substrate or substrates during the step of stabilizing the seal of the substrates, by a reduction in the treatment temperature which is made possible. The choices of material for the dielectric layer or for the barriers, which thus make it possible to reduce the temperature at which these elements are stabilized, must be regarded as optional aspects of the invention offering additional improvements with regard to the stability of the substrates.

What is claimed:

1. A process for producing a plasma display panel having a first and second glass substrate, wherein each substrate comprises a planar surface, and said planar surface of the first substrate is opposed in parallel to said planar surface of the second substrate, said process comprising the steps of:

depositing a seal on said surface of at least one of the glass substrates wherein the seal is epoxy or polyvinyl butyrate;

placing the first and second substrates over one another with the seal interposed therebetween to form a seal and a glass substrate assembly;

curing the seal to fasten the glass substrates to each other and to form a space between the glass substrates within the cured seal;

vacuum pumping the space;

filling the space with a discharge gas via a means of access; and sealing the means of access, wherein the curing step comprises maintaining the seal and glass substrate assembly for about 30 to 60 minutes at a temperature of between 200° to 300° Centigrade.

2. The process according to claim 1, wherein the curing step is carried out while applying pressure of about 1 to 4 kg/cm² to the seal and glass substrate assembly.

3. The process according to claim 1, wherein the vacuum step is carried out while maintaining the seal and glass substrate at a temperature of between 180° to 250° Centigrade.

4. The process according to claim 1, wherein the sealing step comprises applying a material layer of epoxy or polyvinyl butyrate to the means of access at a temperature of 200° to 300° Centigrade to form a plug.

5. The process according to claim 1, wherein the glass substrates are made of soda-lime glass.

6. A process for manufacturing a plasma display panel having a first glass substrate comprising a planar surface having at least one array of first electrodes deposited thereon and a second glass substrate comprising a planar surface having at least one array of second electrodes deposited thereon, wherein said planar surface of the first substrate is opposed in parallel to said planar surface of the second substrate, said process comprising the steps of:

depositing a layer of organic dielectric material on the planar surface of the first glass substrate and optionally on the planar surface of the second glass substrate, at a temperature sufficient to cure the dielectric layer;

forming a barrier layer on the dielectric material of the second glass substrate, when present, wherein the barrier layer has a prescribed pattern projecting toward the first glass substrate, at a temperature sufficient to cure the barrier layer;

depositing a seal on said surface of at least one of the glass substrates, wherein the seal comprises a material layer selected form the group consisting of epoxy and polyvinyl butyrate; and bonding the glass substrates to each other by curing the seal therebetween, whereby a space is formed between the glass substrates within the cured seal, and wherein said space contains a discharge gas.

7. A process according to claim 6 wherein the prescribed patterns of the barrier layer is formed to contain phosphor stripes between adjacent barriers to form a repetitive pattern of three successive adjacent stripes of different emission colors.

8. A process according to claim 6 wherein the dielectric material is an organic material deposited to form a layer having a thickness of a range from 2 to 20 microns.

9. A process according to claim 6 wherein the layer of dielectric material comprises a polyphenylquinoxaline or polyimide material.

10. A process according to claim 6 wherein the dielectric material is a material which does not require curing temperatures above 400° Centigrade.

11. A process according to claim 6 wherein the dielectric material is formed from a material which does not require curing temperatures above 440° Centigrade.

12. A process according to claim 6 wherein the curing step of the dielectric material comprises maintaining the dielectric material at a temperature of between 300° to 400° Centigrade for about 20 to 60 minutes.

13. A process according to claim 6 further comprising depositing a layer of magnesium oxide on the dielectric layer before the forming of the barrier layer step.

14. A process according to claim 13 wherein the magnesium oxide layer has a thickness of 0.5 $\mu$m.

15. A process according to claim 13 wherein the depositing step of magnesium oxide is deposited on the dielectric layer using a cold deposition technique.

16. A process according to claim 6 wherein the barrier layer is formed from a material which does not require curing temperatures above 400° Centigrade.

17. A process according to claim 6 wherein the barrier layer is formed from a material which does not require curing temperatures above 440° Centigrade.

18. A process according to claim 6 wherein the curing step of the barrier layer comprises maintaining the barrier layer at a temperature of between 300° to 400° Centigrade for about 20 to 60 minutes.

19. A process according to claim 6 wherein the barrier layer is a polyimide material.

* * * * *